Dec. 30, 1930.  W. T. FISK  1,787,191
WOODWORKING MACHINE
Filed June 23, 1927   2 Sheets-Sheet 1

Inventor
William T. Fisk
By
Attorney

Dec. 30, 1930.  W. T. FISK  1,787,191
WOODWORKING MACHINE
Filed June 23, 1927  2 Sheets-Sheet 2
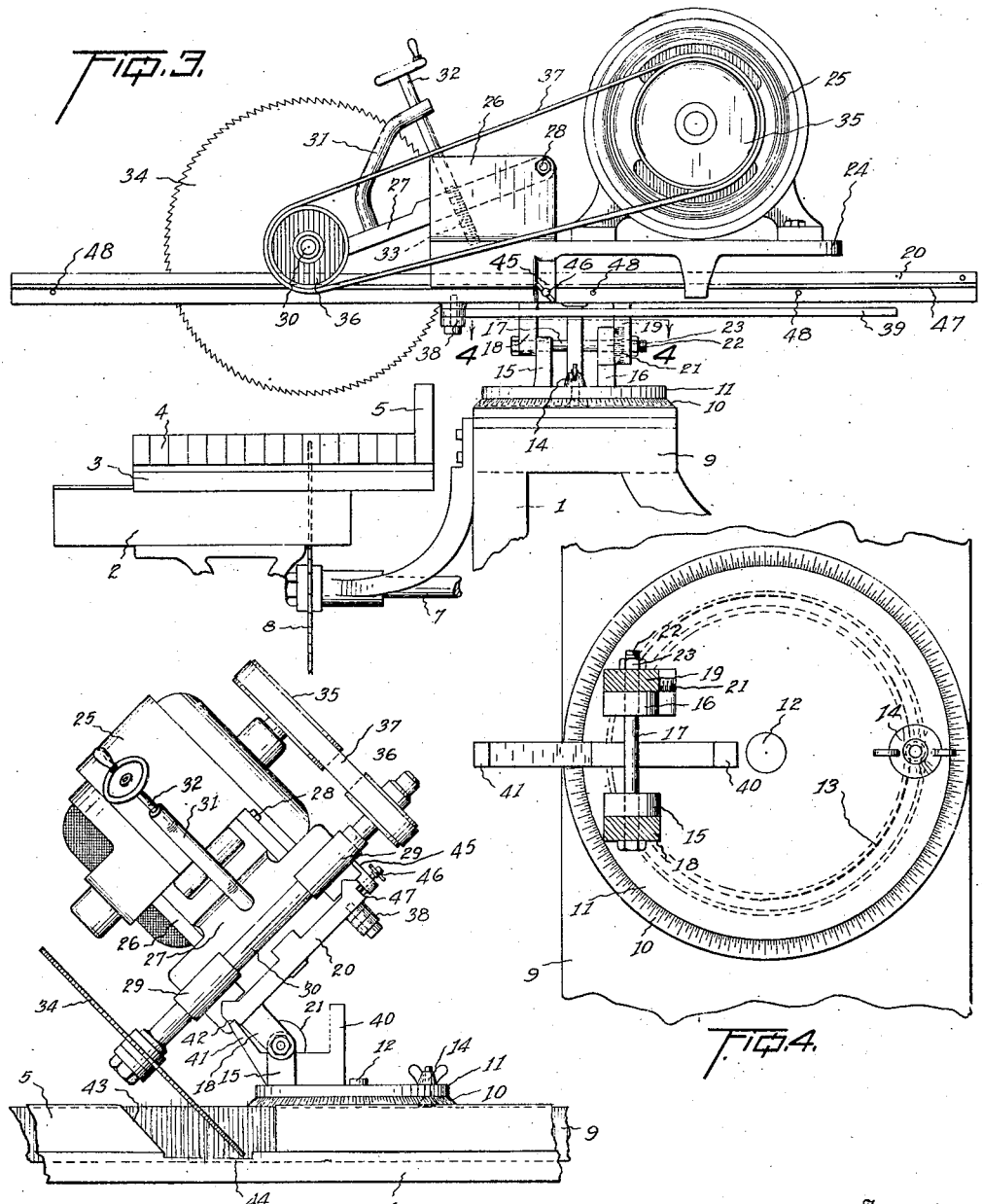
Inventor
William T. Fisk
By
Attorney Patented Dec. 30, 1930

1,787,191

UNITED STATES PATENT OFFICE

WILLIAM T. FISK, OF DETROIT, MICHIGAN, ASSIGNOR TO MASTER WOODWORKER MFG. CO., OF DETROIT, MICHIGAN, A CORPORATION OF MICHIGAN

WOODWORKING MACHINE

Application filed June 23, 1927. Serial No. 200,833.

The present invention pertains to a novel woodworking machine and involves certain improvements on the machine shown in Patent No. 1,482,631, February 5, 1924.

The patented machine enables a saw to be moved on a horizontal track, tipped vertically and swung laterally, but makes no provision for cutting at an angle to the vertical or horizontal. The object of the present invention is to provide a machine wherein such angle cutting may be effected by tilting the saw to a plane at an angle to the vertical and horizontal.

In the accomplishment of this object, the track on which the saw carriage slides is made to tilt on a pivot shaft which lies in a horizontal plane when the track is horizontal. When the track is tilted on its pivot shaft, the saw assumes a plane angular to the vertical. Beneath the carriage are provided a pair of stops for maintaining the carriage in horizontal position and in its angular position. The track is held in intermediate positions by means of a clamping nut. In addition to this angular adjustment, the saw is capable of the various adjustments shown in Patent No. 1,482,631.

The invention is fully disclosed by way of example in the following description and in the accompanying drawings, in which—

Fig. 2 is a similar elevation showing the machine tilted so that the plane of the saw is angular to the vertical;

Fig. 3 is a side elevation; and

Fig. 4 is a plan section on the line 4—4 of Figure 3.

Reference to these views will now be made by use of like characters which are employed to designate corresponding parts throughout.

Figure 1:
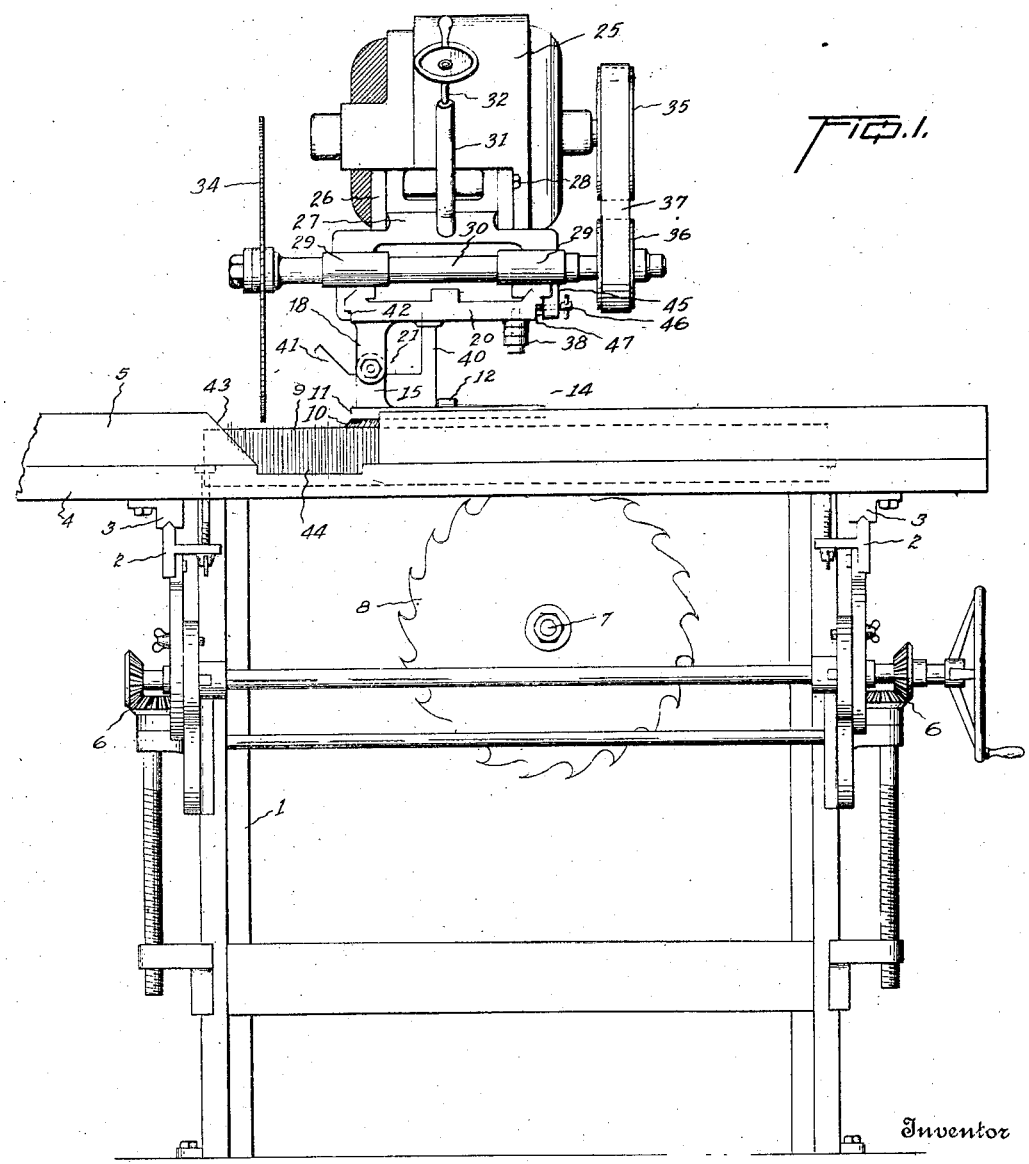
Figure 1 is a front elevation of the device.

In common with the machine disclosed in Patent No. 1,482,631, the present machine comprises a frame 1 supporting a pair of ways 2 on which are mounted a pair of slides 3 carrying a saw table 4. At the rear edge of the table is an upstanding guide 5 extending transversely of the frame. The frame carries mechanism 6 for adjusting the elevation of the table 4 as described in Patent No. 1,482,631. A shaft 7 journaled in the frame carries a rip saw 8 positioned to attack the work from the lower surface thereof.

The frame 1 further includes a head member 9 having a circular series of graduations 10 formed thereon. On the head is mounted a turn-table 11 adapted to revolve on a central pivot member 12. A groove 13 formed in the top of the head 9 receives the lower end of a clamping device 14 carried by the turn-table, whereby the turn-table may be clamped in various positions of adjustment with reference to the head. The turn-table has a pair of upright bearings 15 and 16 standing thereon for the purpose of accommodating a pivot shaft 17. The shaft is further engaged by a pair of upwardly extending arms 18 and 19 which carry a double track member 20 normally lying longitudinally of the frame 1. The arm 19 has a graduated knuckle 21 around the pivot point thereof and adapted to cooperate with a suitable index on the bearing member 16. One end of the shaft 17 is threaded as at 22 and carries a nut 23 for clamping the member 19 against the member 16 in any desired angular position which is indicated on the graduated knuckle 21.

Upon the track 20 is slidably mounted a carriage 24 which supports a motor 25. At the forward end of the carriage is formed an integral channel member 26 in which a yoke 27 is pivoted on a pin 28. The yoke extends forwardly out of the channel and is formed at its forward end with a pair of aligned bearings 29 which support a saw shaft 30. On the upper surface of the member 27 is provided a hand-piece 31 through which is passed a spindle 32 having its lower end threaded as at 33 through the yoke 27 and its lower extremity resting on the base of the channel 26. This device serves to regulate the elevation of the saw shaft as described in detail in the above mentioned patent. The saw 34 on the shaft 30 is driven from the motor 25 by pulleys 35 and 36 on the motor shaft and saw shaft respectively, which pulleys are joined by a belt 37.

The lower surface of the carriage 20 is equipped with a pair of spaced ears 38 between which is pivoted a tilting lever 39. When it is desired to place the saw 34 in a plane at an angle to the vertical, the lever 39 is brought perpendicular to the track 20 and is raised or lowered to tilt the carriage accordingly after the nut 23 has been loosened. When the desired position of the saw 34 has been located, the nut is again tightened.

The turn-table 11 further carries a double stop comprising arms 40 and 41 for determining the horizontal and maximum angular position of the saw 34. The stop 40 is equal to the combined length of the members 15 and 18, so that the carriage will take a horizontal position when resting on the arm 40. The angularity and length of the arm 41 are such that when its end is received in a notch 42 at the edge of the carriage, the carriage and saw 34 will lie at an angle of 45° to the vertical and horizontal. In order to accommodate the tilting of the saw 34, the rear guide 5 has a recess 43 and the saw table 4 has a notch 44 beneath the recess so that the saw will not be obstructed in its adjustments.

For clamping the carriage 24 against sliding movement on the track 20, there is provided a lug 45 depending from the carriage and supporting a clamp screw 46 adapted to enter a notch 47 at the corresponding edge of the carriage as shown more clearly in Figure 2. Further, the screw may be entered into apertures 48 formed at intervals along the carriage, whereby a firmer clamping action may be obtained at these selected points.

It will be apparent that this machine enables cutting at an angle to the vertical and horizontal as well as the adjustments shown in Patent No. 1,482,631.

Although a specific embodiment of the invention has been illustrated and described, it will be understood that various alterations in the details of construction may be made without departing from the scope of the invention as indicated by the appended claim.

What I claim is:

In combination with a support, a track pivotally mounted thereon, the pivotal axis being parallel to the longitudinal axis of the track, whereby said track may be tilted in a direction transverse of its length, a vertical saw slidably mounted on said track and lying in a plane parallel to the longitudinal axis of the track, and a double stop member carried by said support and consisting of two arms engageable by said track in different angular positions, one of said arms being a vertical member adapted to hold said track in a horizontal position, and the other arm being inclined at 45° to the horizontal, whereby the angular movement of the track is limited to a movement between its horizontal position and one at an angle of 45° thereto.

In testimony whereof I affix my signature.

WILLIAM T. FISK.